June 10, 1947.   O. A. BUETTNER   2,421,742
COMPOSITE AIRCRAFT
Filed Sept. 3, 1943     2 Sheets-Sheet 1
FIG. 1
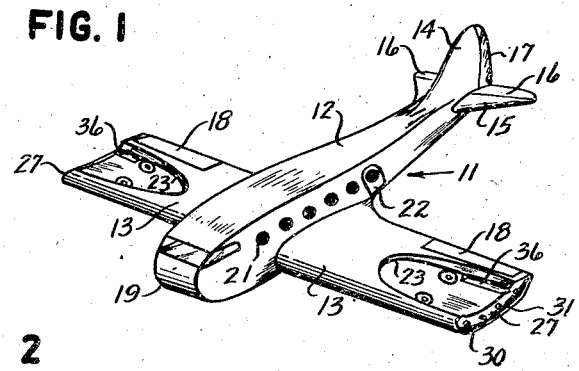
FIG. 2
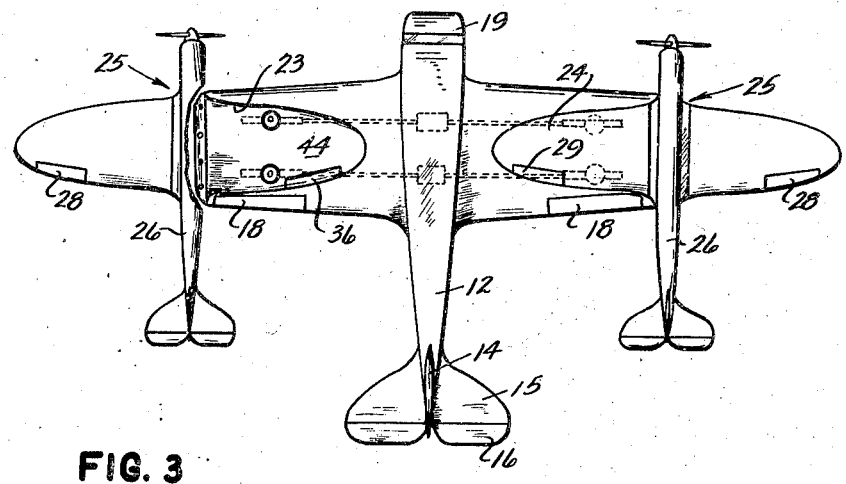
FIG. 3
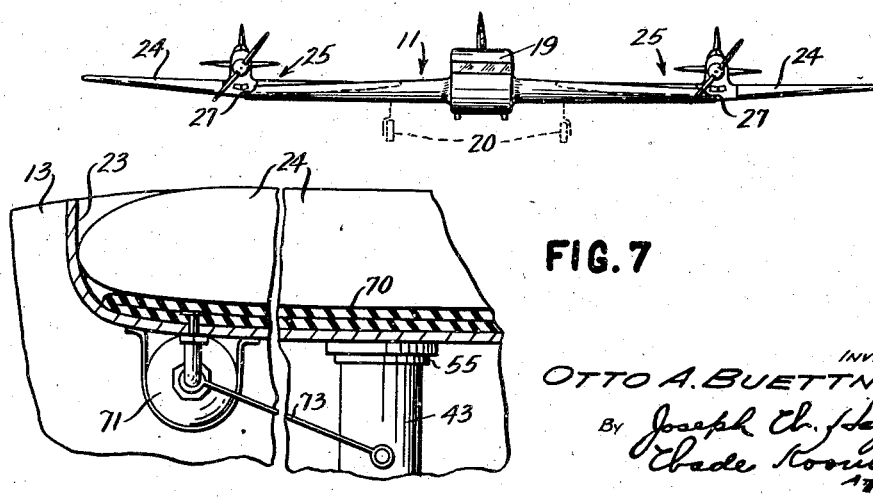
FIG. 7
INVENTOR
OTTO A. BUETTNER
BY Joseph Ch. Hazell
and Chade Koontz
ATTORNEYS June 10, 1947.       O. A. BUETTNER       2,421,742
COMPOSITE AIRCRAFT
Filed Sept. 3, 1943            2 Sheets-Sheet 2
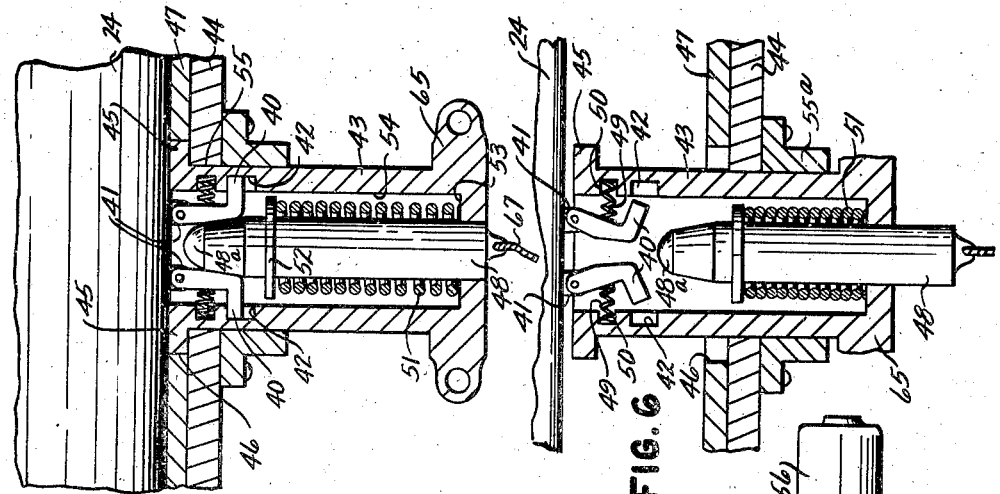
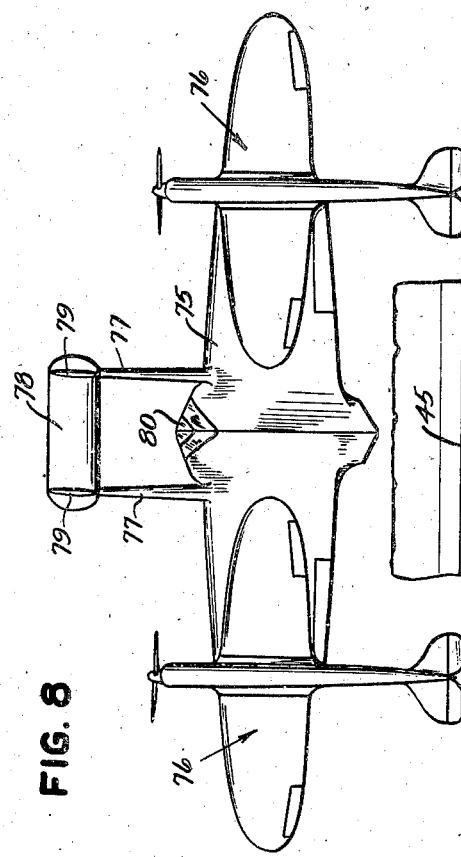
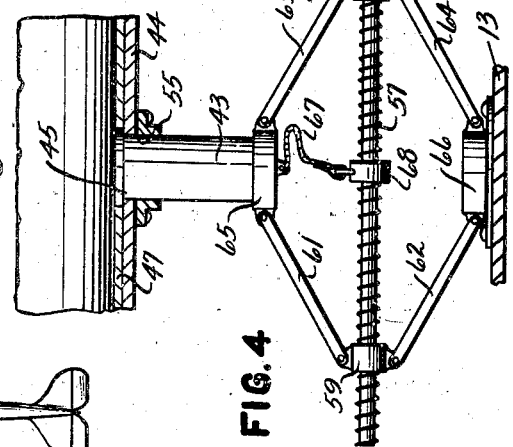
INVENTOR
OTTO A. BUETTNER
BY
ATTORNEYS Patented June 10, 1947

2,421,742

UNITED STATES PATENT OFFICE 2,421,742

COMPOSITE AIRCRAFT

Otto A. Buettner, Pittsburgh, Pa.

Application September 3, 1943, Serial No. 501,089

3 Claims. (Cl. 244—2)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to aircraft and in general aims to provide a glider or gliding shell having means to unite and lock it to a pair of airplanes so that the composite structure may be flown, and power means under operator control to release the airplanes quickly, so that each may pursue its course while the glider may be brought to the ground without injury. Another object is to provide an aircraft composed of a glider and two airplanes, the composite wing of which is a fairly efficient airfoil. The glider of my invention may carry troops and/or supplies to a certain objective, or it may be nothing more than an expendable fuel tank, permitting two planes of short flying range to make extremely long flights, e. g. transoceanic flights, and when near their landing point to jettison the glider after drawing off the last of its fuel. My invention may also be useful in supplying isolated troops in areas which are unsafe for aircraft landings, since the gliders may contain large quantities of ammunition, food, medical supplies, etc. and may be caused to descend approximately where needed, while the airplanes may return to their starting point. Other objects of the invention are to provide a dependable locking and releasing mechanism for a composite aircraft of the character indicated, also to provide means which will improve the flying or gliding characteristics of the glider by minimizing drag. Further objects will be apparent from the following description of two embodiments of the invention shown in the accompanying drawings, wherein:

Fig. 1 is a perspective view of the glider per se;

Fig. 2 is a top plan view of the composite flying structure composed of two complete airplanes with the glider of Fig. 1, one wing of one airplane being omitted to expose the construction;

Fig. 3 is a front elevation of the flying structure of Fig. 2;

Fig. 4 is a detail in sectional elevation of part of the mechanism for locking and releasing the airplanes;

Fig. 5 is a sectional view on a larger scale than Fig. 4 showing the locking means in locked position;

Fig. 6 is a view similar to Fig. 5 but showing the locking means in releasing position;

Fig. 7 is a detail in section showing how an inflatable bag fills a recess in the glider after the airplanes have been released therefrom; and Fig. 8 is a plan view of another form of the invention.

The broad idea of a composite aircraft is disclosed in a number of patents of which Patents Nos. 1,546,442 to Glessner; 1,627,191 to Martin; and 2,308,764 to Makaroff are fairly representative. Also the "pickaback" plane concept, wherein a small plane takes off from the top of a large one of long flying radius, is shown in several patents, e. g. Mayo No. 1,925,768. In no prior patent or publication known to me has it been suggested that a glider be locked to one wing of two airplanes between which the glider is supported during flight, with means under the control of one or more pilots whereby the glider may be released in flight. Some of the manifold possibilities and advantages of this novel combination and arrangement of aircraft will be explained hereinafter.

Referring first to Figs. 1, 2 and 3, a glider 11 is shown with fuselage 12, wings 13, vertical tail fin 14 and horizontal stabilizer 15. Elevators 16, rudder 17 and ailerons 18 are also indicated, as well as a pilot's compartment 19 and landing gear 20. In this instance the glider is a troop transport and has windows 21 and a door 22. The wings 13 are shown as having a smaller span than would be normally provided for the glider, with substantially square tips. Extending inwardly from the glider wing tips are recesses 23 which are open at the top, each recess 23 receiving the wing 24 of an airplane 25, preferably a monoplane of high power but limited flying radius, such as an interceptor or fighter. The recesses 23 are each of such shape and depth as to fit snugly around substantially one entire airplane wing 24, with the top surfaces of the glider and airplane wings fairing into each other, and with square wing tips of the glider in contact with the fuselage 26 of the airplane. These wing tips may have curved end surfaces 27 which fit around and under the fuselages 26 as shown in Fig. 3. When two airplanes 25 are fitted on the glider, the leading and trailing edges of the glider wings respectively enclose the leading and trailing edges of the airplane wings in the recesses, the latter wings rising only slightly above the top surfaces of the glider wings. Furthermore, the glider wings have a sufficient taper so that they are only slightly wider at their tips than the chord of the airplane wings. The outer wings of the two airplanes form practically one continuous airfoil with the glider wings, as Figs. 2 and 3 clearly indicate.

With a high powered engine in each of the airplanes driving a variable pitch propeller of three or four blades (not shown), the described composite aircraft may take off from most runways and may fly many thousands of miles, since it is a simple matter, with known methods, to pump fuel from tanks (not shown) located in the glider to the tanks of the respective airplanes 25. The fuel conduits are not illustrated, but a fuel connection 30 (Fig. 1) is indicated and this may be considered to be a quick-detachable connection of a well known type, permitting a parting of the fuel line upon a pull or stress on the same, practically without leakage at the connection because of an automatically closing valve. Communication between the two airplanes and between them and the glider pilot may be had through an inter-communicating system of known type (not shown) with a plug 31 at each tip of the glider wings making contact with a socket (not shown) located on the airplane. Other electrical connections may be made through the same or similar plug and socket connections, e. g. for radios, light systems, electric power lines etc. An inter-communicating system will permit the three pilots to coordinate their actions when turning, banking, climbing, diving or releasing the airplanes. As the glider has ailerons, a rudder, and elevators, it may be controlled like the airplanes. A small engine (not shown) may even be installed on the glider to rotate a propeller to make possible better control of the glider when cast loose by the airplanes near the point where the glider is to be landed.

When banking the composite aircraft, the outer ailerons 28 of the two airplanes should be controlled in unison with the ailerons 18 on the glider. However, the inner ailerons 29 on the airplanes are useless at this time, being wholly within the recesses 23. As it is highly undesirable to prevent operation of the inner ailerons, since the airplanes should be releasable at any moment, special recesses 36 are provided to receive the inner ailerons and permit free angular movement of the same simultaneously with the useful angular movement of the outer ailerons 28. The three rudders and the three sets of elevators may, of course, be controlled from the three pilots' compartments without any difficulty.

To lock the two airplanes to the glider, several different mechanisms may be employed. The one illustrated in Figs. 4, 5 and 6 comprises not only locking and releasing means but also power means for initially pushing apart or forcibly separating the two locked wings as soon as they are unlocked. The underside of the inner or lockable wing of each airplane has a pair of pivoted L-shaped latches 40 depending from lugs 41, the ends of said latches engaging notches 42 in the side walls of a slidable sleeve 43 which is movable through the bottom wall 44 of recess 23. At its upper end each sleeve 43 has a flange 45 which when the sleeve is lowered fits an aperture 46 in a circular plate 47 fixed to bottom wall 44, thereby to lie flush with plate 47 (Fig. 5). Within the sleeve is a keeper 48 having its upper end provided with a rounded or cam nose 48a for engagement with the latches to force them into the notches and hold them there. Coil springs 49 whose outer ends are fixed in recesses 50 in the sleeve engage the latches with their inner ends and tend to force the latches automatically out of the notches 42 when the withdrawn position of the keeper (Fig. 6) permits such action. A coil spring 51 surrounds the keeper and bears against an annular collar 52 fixed to the keeper near its upper end and also against the bottom wall 53 of the slidable sleeve, so that the keeper is normally forced into the latch-engaging position of Fig. 5 but may be retracted against the resistance of the coil spring, as shown in Fig. 6, to release the latches. When the latches are released, the flexible springs 49 yield to the latches as they are moved upwardly out of the central bore 54 of the sleeve, responsive to the separating of the airplane wing from its recess. An annular reinforcing collar 55a, fixed to the glider wing, may surround the aperture 55 through which the sleeve slides and will provide a longer bearing for the sleeve.

To operate each sleeve to thrust an airplane wing upwardly and away from its recess when an airplane is to be freed from the glider, a toggle linkage is provided, together with a servomotor to expand and contract the linkage, the entire mechanism preferably being located inside the glider wing beneath the recess 23. Reversible servomotor 56 (which may be fixed to a wing rib or spar, not shown) rotates a lead screw 57 through reduction gearing enclosed in gear box 58. The switches and circuits, by which one or more operators control the rotation of the servomotors, are not shown because they are conventional. Two nuts 59, 60 travel back and forth on the lead screw, which is held against axial movement. Pivoted to nut 59 are two links 61, 62 while nut 60 likewise is pivotally connected with two links 63, 64. Links 61 and 63 are also pivoted at their other ends to a flange 65 integral with the slidable sleeve, while links 62, 64, are pivoted at their other ends to an anchoring ring 66, which may be riveted to the glider wing. The described arrangement will give the servomotor mechanical advantage to thrust the sleeve upwardly with great force and with sufficient speed to insure quick parting of the two wings as soon as the latches are disengaged. A wire cable 67, fast to the lower end of the keeper, is secured at its other end to a non-rotating sleeve 68 surrounding the lead screw, which thus provides an anchor for the cable. As the toggle linkage expands, i. e., as nuts 59, 60 approach each other, sleeve 43 is first moved upwardly and then the inextensible cable 67 separates the keeper from the upwardly moving latches, whereupon the coil springs force the latches out of the notches 42 as already explained. Preferably there will be two wing-locking mechanisms as described for releasably securing an airplane wing to a glider wing; however, it is within the scope of the present invention to design the recesses 23, and the airplane wings which fit into them, in such a way that the wings are partially locked by interfitting surfaces, for instance along the leading edges of the airplane wings, and complete locking is obtained by employing only one toggle linkage mechanism. When the composite aircraft is in full flight, there will be powerful forces tending to hold the locked wings together, since frequently up to 70% of the lift arises from negative pressure on the top surfaces of an airfoil, and this negative pressure will tend to hold the juxtaposed wings together even without latching means. It will be appreciated, however, that when banking, climbing, diving, or turning, some form of dependable locking means is essential.

To fill the recesses 23 so that the glider may have good gliding characteristics, an inflatable bag 70 (Fig. 7) may be fixed, for example by cement, to the bottom of each recess between the wing locking means, and the shape of these bags may be such that when inflated each bag almost completely fills a recess with its upper surface fairing with the top surface of the glider wing. Rubber or certain rubber-like plastics may be used to make these bags, and carbon dioxide gas, under pressure in a valved bottle 71 (which may be held on the glider wing adjacent the recess) may blow up the bags. A very simple valve arrangement (not illustrated) may automatically open the bottle 71 to start inflation as soon as the airplane wing moves out of its recess, the valve being opened by a lever 73 moved by sleeve 43 as it nears its upper limit of movement, shown in Fig. 6. Apertures (not shown) may be formed in the inflatable bag to permit movement of sleeves 43 and separation of the latches 40 from said sleeves, as above described. The arrangement of Fig. 7 is omitted from other figures of the drawings because it is a constructional detail which is not essential.

Now referring to Fig. 8, a glider 75 has two airplanes 76 alined spanwise as in Fig. 2, and secured by locking means (not shown) to permit the component parts of the aircraft to fly as one airfoil and yet be releasable from each other when desired. A pair of twin booms 77 extend forwardly of the leading edge of the glider airfoil parallel to each other and at equal distances from the central axis of the glider. Secured to the forward ends of booms 77 is a horizontal stabilizer 78 having spaced vertical stabilizers 79 which may have the usual rudders (not shown) hinged adjacent their trailing edges. The pilot may sit in a small cabin at the nose 80. I prefer this form of glider because it will be more stable and will have better gliding characteristics.

In some instances it may be desirable to employ a towing plane to help lift the loaded composite aircraft off the ground, with controlled disengagement of the towing line once the aircraft is flying at a safe speed, as is known in the art of gliders. While releasing of the airplanes by the airplane pilots was described, where the glider has a pilot it may be desired to operate the wing-releasing mechanisms simultaneously from a station in the glider cabin. Also, it has been assumed that the airplanes are to be released before the glider descends to the ground, but if preferred the composite airplane may land without disengagement of the locked wings, wherever a paved runway of sufficient length is available. By designing the glider wings properly, there will be sufficient room inside each wing for men to crawl during flight from the glider wing tips through trap doors (not shown) and over the airplane wings to the airplane cabins or cockpits, if means are provided on the airplane wings to afford hand holds. Movement of personnel in the other direction will be no more difficult.

The described aircraft will make it possible to deliver two airplanes of short flying radius to the most distant and inaccessible regions of the world. The glider may deliver personnel and/or supplies at any point, or if military necessity requires, it may be jettisoned at any time. If the composite aircraft arrives over an area where friendly troops are advancing against the enemy, the glider may be brought to the ground to supply the troops or an advanced air field, and the airplanes, freed of their burden and with a full load of fuel, may proceed to attack the enemy before landing at the air field. If the glider is made buoyant, with pontoons or amphibian landing gear instead of the wheels illustrated in Fig. 3, landings may be made on water under favorable conditions. Other possible uses of the described aircraft will occur to military and naval personnel.

What I claim is:

1. In a motorless monoplane glider adapted to be carried aloft by a pair of powered monoplanes with the fore and aft axes of all three aircraft lying parallel and having the same directional orientation, said monoplane glider comprising a fuselage and right and left wing sections, said wing sections each being provided with a recess in the top surface thereof extending through the wing tip and toward the said fuselage for a distance sufficient to accommodate substantially an entire wing section of one of said powered monoplanes therein, complementary detachable connecting means carried on the underside of the wing sections of said powered monoplanes and in the recessed portions of the said monoplane glider wing sections for securing one wing section of each of said pair of powered monoplanes to one each of said monoplane glider wing sections with the central fore and aft axis of each powered monoplane lying adjacent to the opposite wing tips of the said monoplane glider, release of said complementary detachable connection means releasing said monoplane glider from said powered monoplanes for independent airborne operation.

2. In a motorless monoplane glider adapted to be carried aloft by a pair of powered airplanes with the fore and aft axis of all three aircraft lying parallel and having the same directional orientation, said monoplane glider having opposed wing sections with control surfaces thereon, each said wing section being provided with a recess in the top surface thereof extending through the wing tip and inwardly along the wing section for a sufficient distance to accommodate substantially an entire wing of a powered airplane, each said recess having an aileron slot along a portion of the periphery thereof for permitting aileron operation of attached powered monoplanes, an inflatable bag in each said recess adaptable to be inflated to substantially fill the said recess to give gliding characteristics to the monoplane glider, thrust producing means operable for thrusting a powered airplane wing out of said recess, and detachable connection means operatively connected with the said thrust producing means in the said recess for securing a powered airplane wing within said recess adaptable upon the said thrust producing means thrusting a powered airplane wing out of said recess to detach the said detachable connection means.

3. In a composite aircraft; a motorless monoplane glider having a fuselage and wings with control surfaces thereon facilitating guiding thereof; the said monoplane glider wings being provided with a recess in the top surface thereof extending through the wing tip and toward the said fuselage for a sufficient distance to accommodate substantially an entire wing of a powered monoplane, each said recess having an aileron slot along a portion of the periphery thereof; a collapsed inflatable bag secured to the bottom wall of each said recess adaptable to be inflated to substantially fill the said recess; a powered monoplane on opposite sides of the said monoplane glider and having the same directional orientation with their wings arranged spanwise with the monoplane glider wings, the adjacent wing of each powered monoplane fitted within the respective recess against the said inflatable bag with an aileron thereof operable in the said aileron slot; complementary detachable connection means detachable in flight associated with each glider wing recess and the underside of the respective powered monoplane wing for securing the two said powered monoplanes and the said monoplane glider together for flight as a composite unit; and power actuated means operable during detachment of the said complementary detachable means to thrust the said monoplane glider and the powered monoplane wings apart and to actuate inflating means for inflating the said inflatable bag to give gliding characteristics to the said monoplane glider.

OTTO A. BUETTNER.

REFERENCES CITED

The following references are of record in the file of this patent:

UNITED STATES PATENTS

| Number | Name | Date |
|---|---|---|
| 1,783,227 | Dornier | Dec. 2, 1930 |
| 1,628,098 | Abreu | May 10, 1927 |
| 1,650,346 | Hall | Nov. 22, 1927 |
| 997,122 | Fenn | July 4, 1911 |

FOREIGN PATENTS

| Number | Country | Date |
|---|---|---|
| 731,911 | France | June 6, 1932 |
| 546,587 | Great Britain | July 20, 1942 |